UNITED STATES PATENT OFFICE.

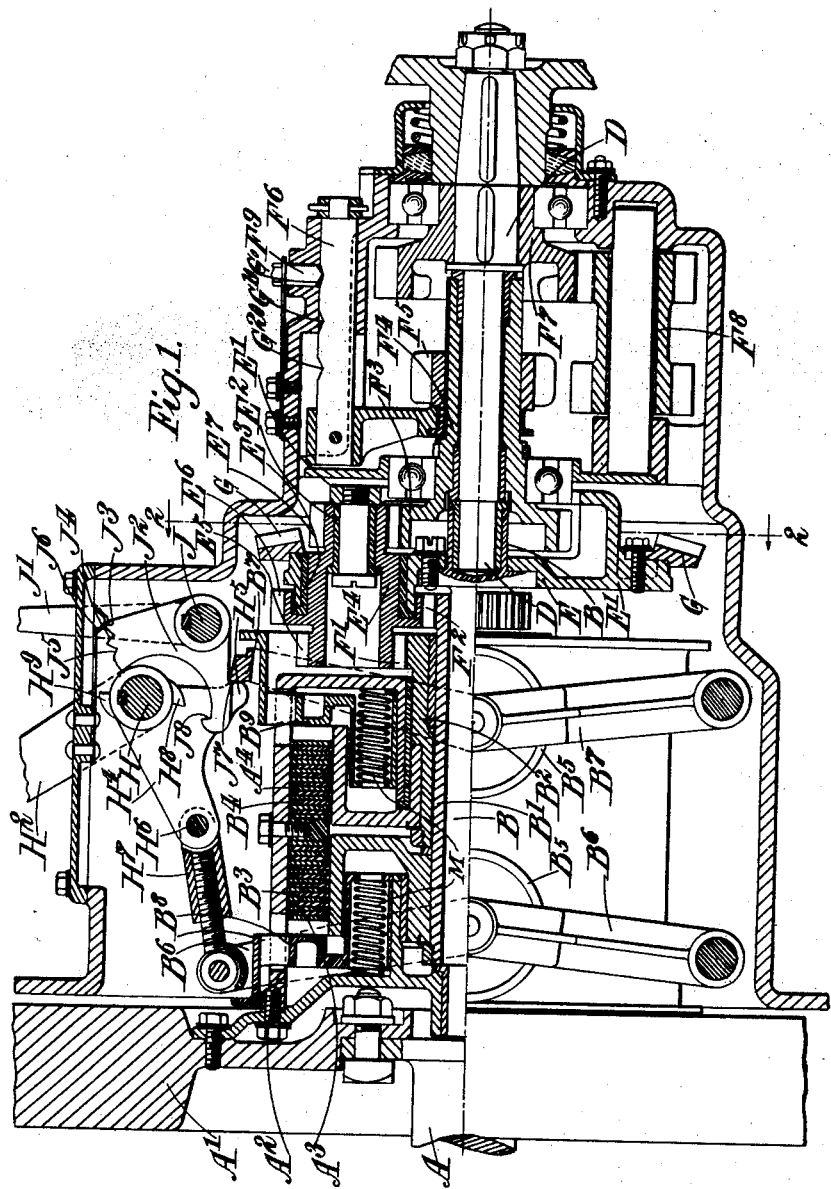

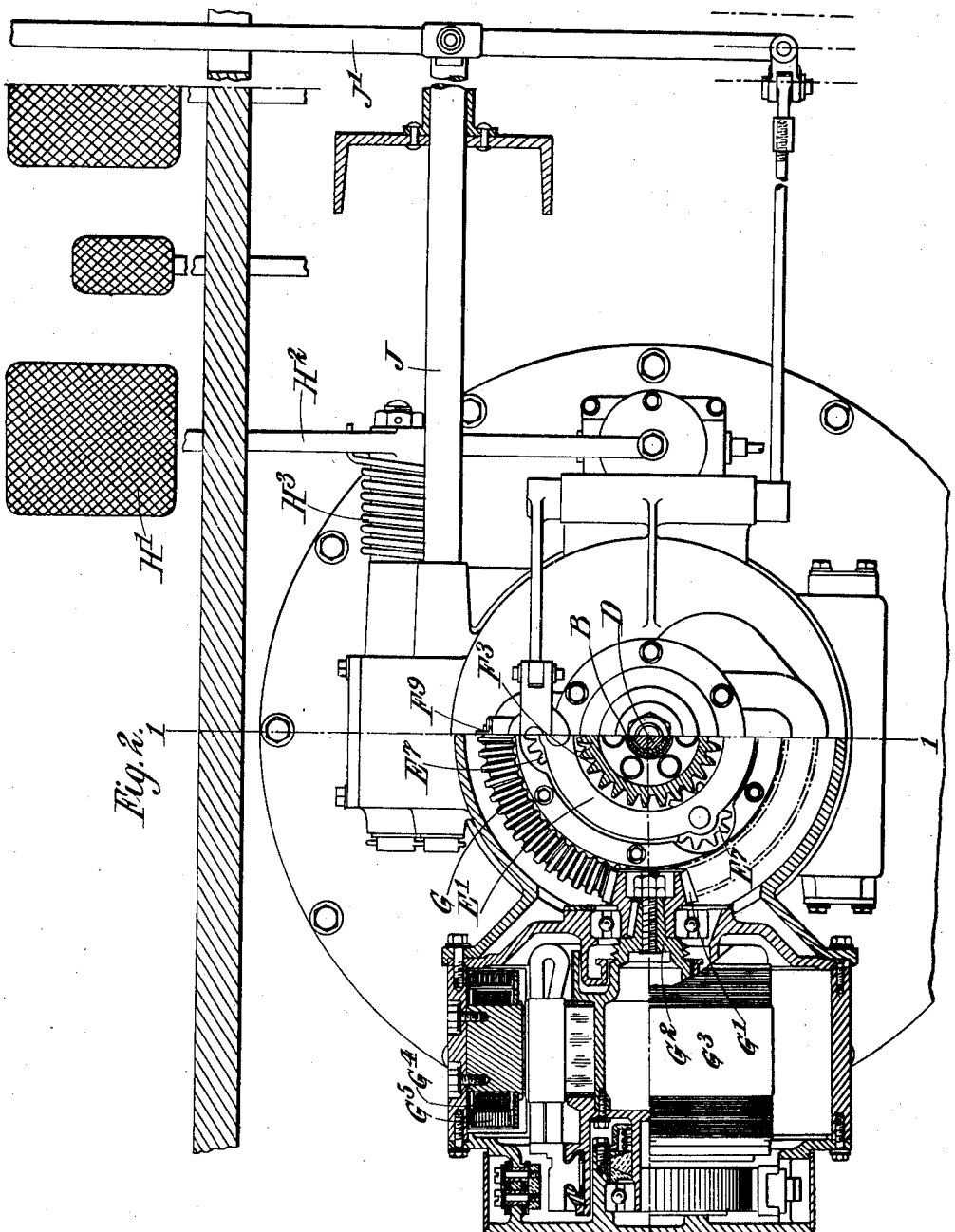

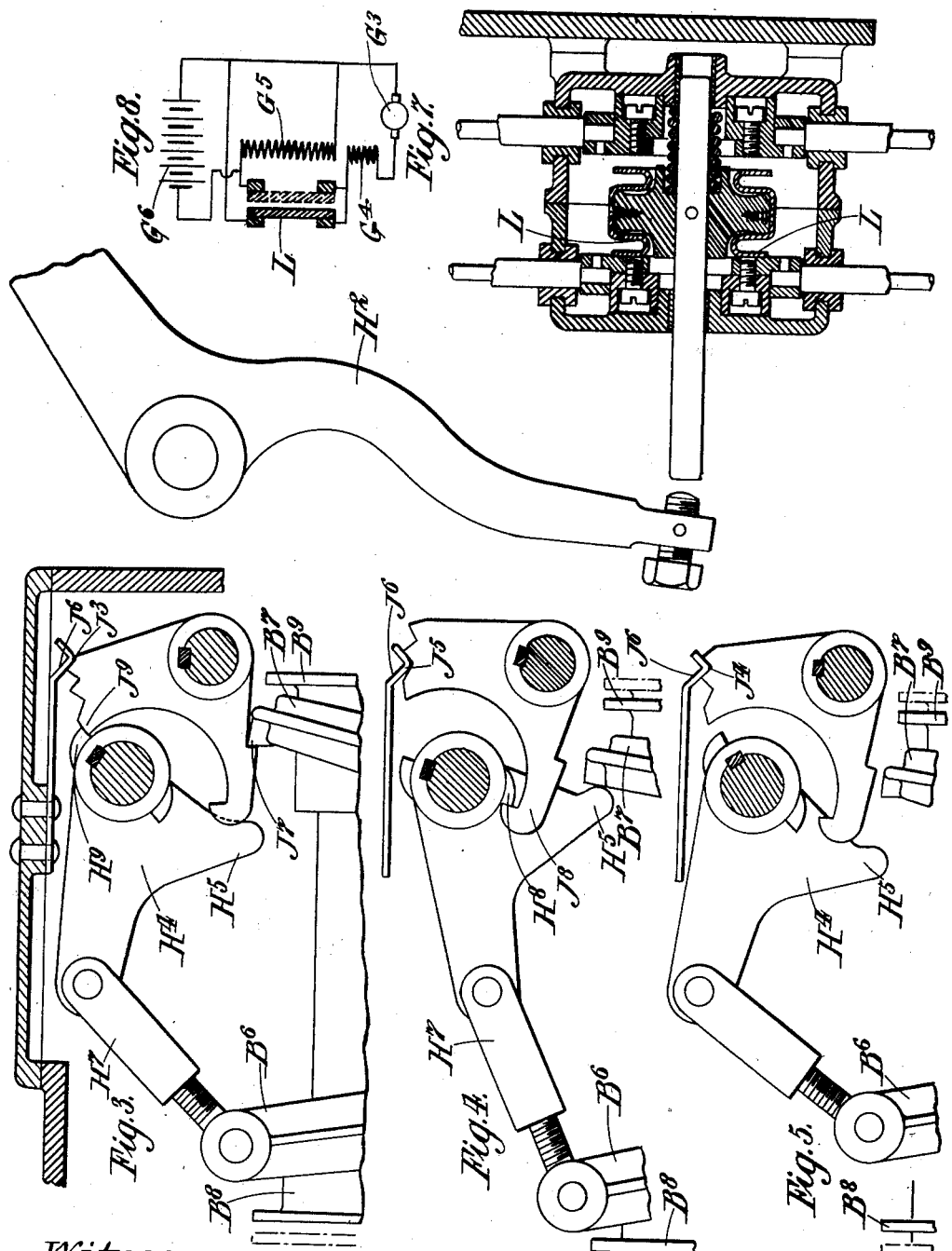

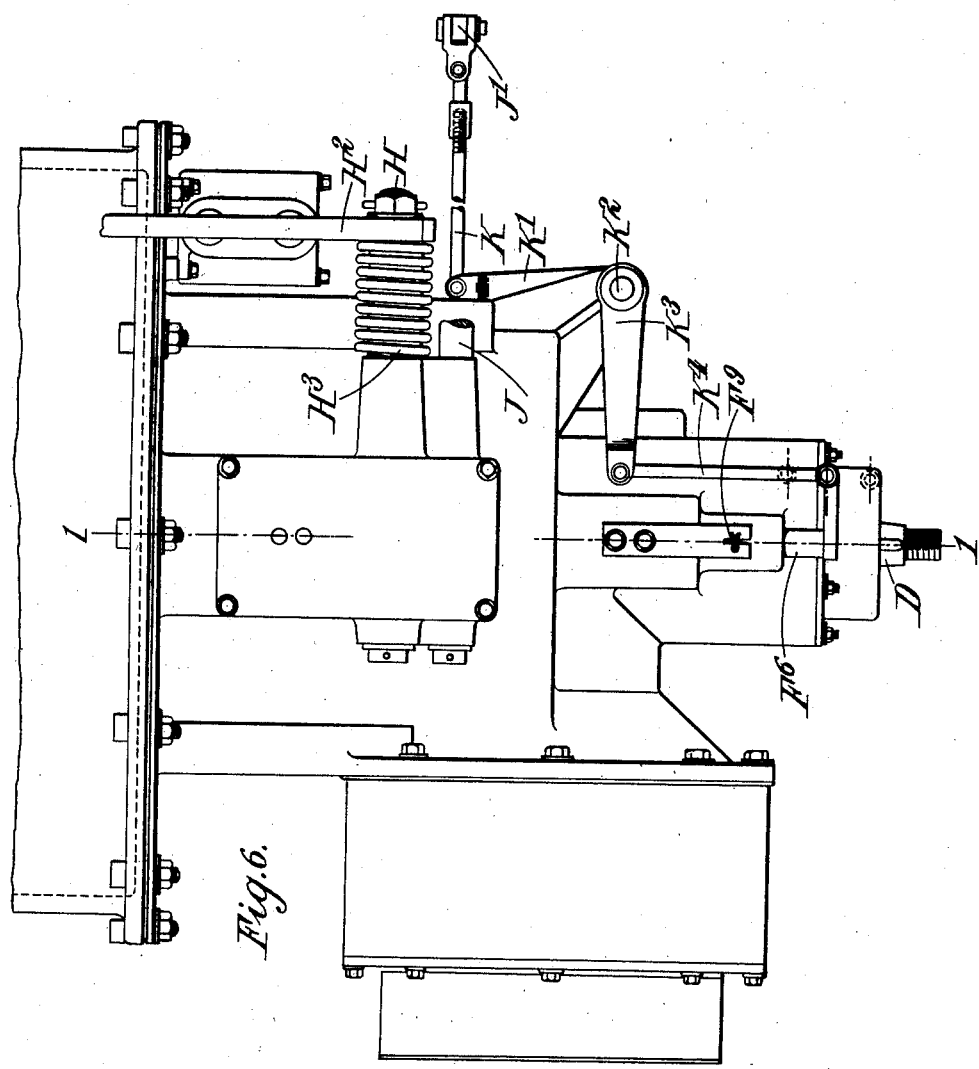

GILLIS von ZWEIGBERGK, OF ST. ANNES ON SEA, ENGLAND.

CHANGE-SPEED GEAR.

1,384,504.  Specification of Letters Patent.  Patented July 12, 1921.

Application filed July 23, 1918. Serial No. 246,356.

*To all whom it may concern:*

Be it known that I, GILLIS VON ZWEIGBERGK, a citizen of the United States of America, residing at St. Annes on Sea, in the county of Lancaster, England, have invented certain new and useful Improvements in Change-Speed Gears, of which the following is a specification.

This invention is for improvements in or relating to change-speed gears of the epicyclic type and has for its object to provide a gear which will give two or more speeds in both the ahead and reverse directions and shall be easy to manipulate. The main feature of the invention lies in the use of a yielding reaction device operative for example on the planet-carrying member, comprising a compound wound dynamo electric machine whereof the shunt winding is separately excited and the armature is connected across the series winding in such manner as to reinforce the shunt field when the armature is driven. In this way a reaction is obtained which varies in the same sense as does the motion which is to be retarded. Further features of the invention relate to means whereby a smooth change can be made without jolting or jerking the driven member. The invention is particularly suitable for use on self-propelled vehicles, and this form of it will be described by way of example, although it will be understood that the invention may be applied in other ways.

In the accompanying drawings—

Figure 1 is mainly a longitudinal section on the line 1—1 of Figs. 2 and 6, but with some parts broken away;

Fig. 2 is an end elevation of the mechanism as arranged in a self-propelled vehicle looking toward the front of the vehicle, but with part shown in section on the line 2—2 of Fig. 1.

Figs. 3, 4 and 5 are detail sketches showing different positions of certain parts of the mechanism;

Fig. 6 is a plan of Fig. 2;

Fig. 7 is a sectional view of a detail, and

Fig. 8 is a diagram of connections.

Like reference characters indicate like parts throughout the drawings.

Referring first to Fig. 1, the driving-shaft A carrying a fly-wheel $A^1$ has mounted upon it a clutch-casing $A^2$ containing two sets of plates $A^3$ $A^4$ for two multiple disk-clutches. Spigoted in the end plate of the casing $A^2$ is an intermediate shaft B upon which are mounted two concentric sleeves $B^1$ $B^2$. These sleeves are free to rotate separately and carry the sets of disks $B^3$ $B^4$ respectively coöperating with the sets $A^3$ $A^4$, the sets of disks normally being held in engagement by springs M. The two clutches are operated by rollers $B^5$ on bent levers $B^6$ $B^7$ respectively engaging collar-like members $B^8$ $B^9$ which rotate with the casing $A^2$ and can move longitudinally to press the respective sets of plates together. The levers $B^6$ $B^7$ are pivoted near the bottom of the casing for the gear.

The right-hand end of the shaft B has spigoted in it the end of the driven-shaft D and it also carries a flange E to which is secured a suitably shaped member $E^1$ provided with bearings $E^2$ $E^3$ for three compound pinions whereof only one is shown. This pinion $E^4$ comprises three toothed gears $E^5$ $E^6$ $E^7$ whereof $E^5$ $E^6$ mesh respectively with gears $F^1$ $F^2$ formed on or secured to the sleeves $B^2$ $B^1$. The gear $E^7$ meshes with a gear $F^3$ fast on a sleeve $F^4$ loosely mounted on the shaft D, and the sleeve also carries on splines a sliding gear $F^5$ operated by a shift rod $F^6$ to move into three different positions. A wheel $F^7$ toothed internally to receive the wheel $F^5$ and externally to engage with a reversing gear, whereof part is indicated at $F^8$, is keyed on the shaft D. The rod $F^6$ is notched at $G^9$ $G^{10}$ $G^{20}$ to receive a spring pressed stop $F^9$ to determine the three positions of the wheel $F^5$ for reverse (as illustrated), off and ahead driving.

The member $E^1$ also has secured on it a bevel gear-wheel G, see also Fig. 2, and a small bevel-wheel $G^1$ meshes with it. This wheel $G^1$ is secured on the shaft $G^2$ of a dynamo electric machine which is disposed transversely to the axis of the shaft A, B, D. This machine is a compound wound direct current machine having an armature $G^3$, series winding $G^4$ and shunt winding $G^5$. The function of the machine will be explained later.

Referring again to Fig. 1, the clutches $A^3$ $B^3$ and $A^4$ $B^4$ as above stated are controlled by the levers $B^6$ $B^7$ respectively. As is usual with this type of clutch, a spring-control is provided on each, tending to keep it engaged. A shaft H mounted transversely and above the clutches carries an operating pedal $H^1$, on an arm $H^2$, a controlling spring $H^3$ which tends to hold the pedal $H^1$ in its uppermost position, (see Fig. 2) and a member $H^4$ which will be termed the "push-member". The member $H^4$ is roughly triangular in shape; one corner $H^5$ engages the lever $B^7$, another corner $H^6$ has a link connection $H^7$ to the lever $B^6$, and a boss concentric with the shaft H has two projecting ratchet-like teeth $H^8$ $H^9$. The push-member $H^4$ is so shaped and proportioned that when in the position shown in Fig. 1 it holds both clutches out from engagement. When rotated in a clockwise direction, it first frees the lever $B^7$; the link connection $H^7$ has a toggle movement and does not release the lever $B^6$ until the member $H^4$ has been rotated still further. A tail-piece on the arm $H^2$ is arranged to operate a spring-controlled electrical switch, as shown in Fig. 7, at the extreme limit of its upward movement.

A second shaft J is mounted transversely in the casing, parallel to the shaft H and carries a lever $J^1$ (Fig. 2) which is the "change-speed lever." The shaft J is capable of slight rotation and carries also a bell-crank member $J^2$ which will hereinafter be called the "stop-member." One arm of the stop-member $J^2$ has notches $J^3$ $J^4$ $J^5$ engaged by a detent spring $J^6$, and the other arm is formed with hooks or stops $J^7$ $J^8$ adapted to engage respectively the end of the lever $B^7$, and the tooth $H^8$. The tooth $H^9$ on the push member engages the end $J^9$ of the other arm as shown in Fig. 3. The hand-lever $J^1$ is so mounted on the shaft J that in addition to turning the shaft, it can itself turn about an axis transverse to the shaft so that its lower end can take up any of the three positions indicated in Fig. 2. This lower end is connected through the link K, lever $K^1$, shaft $K^2$, lever $K^3$, link $K^4$ (see Figs. 2 and 6) to the rod $F^6$ which controls the reversing gear, and the parts are so proportioned that the movement indicated for the lever $J^1$ operates the rod $F^6$ to the desired extent.

Referring now to Fig. 8, which shows the diagram of connections for the electrical machine, a storage battery $G^6$ is connected across the shunt winding $G^5$, and the switch L (see also Fig. 7) normally short-circuits the armature on to the series field $G^4$, the windings being so arranged that in this position the series and shunt fields reinforce each other. When the switch is operated by the lever $H^2$ it connects the armature and series winding across the shunt winding and battery.

The operation of this gear may now be briefly described.

Assuming that the reversing-gear $F^5$ is in the neutral or "off" position, the pedal $H^1$ is pressed down to the "off" position which is shown in Fig. 1. The hand lever J is first rocked into the "first speed" position, in which the notch $J^3$ is engaged by the detent $J^6$ and is then moved laterally, say to the "ahead" position, thereby bringing the wheel $F^5$ into engagement with the wheel $F^7$. The clutch-lever $B^7$ is now locked by the stop $J^7$, and the pedal $H^1$ when released swings up and rotates the shaft H to the position shown in Fig. 3, and the lever $B^6$ allows the clutch $A^3$ $B^3$ to engage. The drive is therefore imparted to the gear train $F^2$, $E^6$, $E^7$, $F^3$, $F^5$, $F^7$ on the shaft D. The reaction, however, causes the member $E^1$ carrying the gears $E^6$ $E^7$ to turn in the reverse direction and drive the bevel-pinion $G^1$ and electrical machine. The engagement of the tooth $H^9$ with the stop $J^9$ (Fig. 3) prevents operation of the switch L (Fig. 7) and the armature generates a current in the series field reinforcing the shunt field so that the machine is cumulatively loaded and sufficient reaction is provided on the bevel-pinion $G^1$ to transmit the drive to the shaft D. The gearing is therefore epicyclic during the period of starting and the reaction which renders the gear operative is an increasing one while the field is building up. Smooth starting is thereby obtained. The quicker the rotation of the member $E^1$, the higher is the speed of the armature, and therefore the greater is its electrical loading.

The change to the second gear is obtained by depressing the pedal $H^1$ to the "off" position (Fig. 1) and moving the lever $J^1$ to engage the notch $J^5$ by the detent $J^6$ (Fig. 4). When the pedal $H^1$ is released, the lever $B^7$, now free from the stop $J^7$ is released and the clutch $A^4$ $B^4$ is closed automatically, but the stop $J^8$ engaging the tooth $H^8$ (Fig. 4) prevents the push member $H^4$ moving far enough to free the lever $B^6$ and close the clutch $A^3$ $B^3$. The drive is therefore imparted to the gear train $F^1$, $E^5$, $E^7$, $F^3$, $F^5$, $F^7$, and is again transmitted to the shaft D by virtue of the electrical loading of the armature as above described, it being understood that this gear train is of a suitably different velocity ratio from the first.

The third speed or direct drive is obtained by depressing the pedal $H^1$, and moving the lever $J^1$ to engage the notch $J^4$ with the detent $J^6$. On releasing the pedal $H^1$, the spring $H^3$ swings the push-member $H^4$ (Fig. 5) up to the limit of its movement. Both of the clutches $A^3$ $B^3$ and $A^4$ $B^4$ are engaged and the whole gear rotates solidly. The direction of rotation of the armature $G^3$ is reversed and it therefore energizes the series field in the opposite direction. The extra movement of the lever $H^2$ has, however, operated the switch L as indicated in broken lines in Fig. 8 and the armature is connected across the battery. If its speed is low, it will run as a motor, but if the speed is raised, it generates and charges the battery. Moreover, the series field is now opposing the shunt field so that the electrical loading is automatically diminished or removed if so desired.

The engine may be electrically started by the apparatus provided by this invention, and when this is to be done, both clutches are closed while the pedal is in its extreme upward position and the reverse gear is in the "off" position. The switch L is then employed to connect the motor across the battery. An additional switch may, however, be provided in order to disconnect the battery either when the latter is not in use, or when it is not desired to charge it while the engine is running.

The whole of these operations are exactly the same for reversing the drive, with the exception that the lever $J^1$ is moved transversely in the other direction in the first instance. All the variations for three speeds ahead, off, and three speeds reverse are therefore obtained by movement of this one lever.

What I claim as my invention and desire to secure by Letters Patent is:—

1. In an epicyclic change-speed gear the combination with one element of an epicyclic train of gearing, of a compound wound dynamo-electric machine whereof the armature is rotatively engaged with said element, the shunt winding is separately excited and the series winding is connected across the armature in such manner as to reinforce the shunt field when the armature is driven by said element, substantially as set forth.

2. In an epicyclic change-speed gear the combination of a driving sun-wheel, a driven sun-wheel, planetary wheels on a planet-carrier operatively connecting said sun-wheels, an armature of a dynamo-electric machine operatively connected to said planet-carrier, and a compound-wound field system for said armature, the shunt winding thereof being separately excited and the series winding being connected across the armature in such manner as to reinforce the shunt field when the armature is driven by said planet-carrier, substantially as set forth.

3. In an epicyclic change-speed gear the combination of coaxial driving and driven shafts, a plurality of trains of planetary gearing connecting them, said trains having one element common to all, means for selectively or jointly engaging said trains with said shafts, an armature of a dynamo-electric machine operatively connected to said common element and a compound-wound field system for said armature, the shunt winding thereof being separately excited and the series winding being connected across the armature in such manner as to reinforce the shunt field when the armature is driven by said element, substantially as set forth.

4. In an epicyclic change-speed gear the combination of coaxial driving and driven shafts, a plurality of trains of planetary gearing connecting them and having a single element carrying the planet-wheels for all of said trains, means for selectively or jointly engaging said trains with said shafts, an armature of a dynamo-electric machine operatively connected to said planet-carrying element and a compound-wound field system for said armature, the shunt winding thereof being separately excited and the series winding being connected across the armature in such manner as to reinforce the shunt field when the armature is driven by said planet-carrier, substantially as set forth.

5. In a change-speed gear, the combination of a driving shaft, a plurality of gear-wheels freely mounted coaxially therewith, means for selectively or jointly engaging said wheels with said shaft, a second shaft coaxial with said first-mentioned shaft, a gear-wheel fast thereon, a compound planet-pinion meshing with all of said gear-wheels and mounted on a planet-carrier so as to be capable of bodily rotation about the axis of said coaxial shaft, and a compound-wound dynamo-electric machine whereof the armature is rotatively engaged with said planet-carrier, the shunt winding is separately excited and the series winding is connected across the armature in such manner as to reinforce the shunt field when the armature is driven by said planet-carrier, substantially as set forth.

6. In a change-speed gear the combination of an epicyclic train of gearing and a yielding reaction device comprising a compound-wound dynamo-electrical machine whereof the armature is rotatively engaged with an element of said train of gearing, the shunt winding is separately excited and the series winding is connected across the armature in such manner as to reinforce the shunt field when the armature is driven by said element, substantially as set forth.

7. In a change-speed gear the combination of a driving shaft, a plurality of gear-wheels freely mounted coaxially, a corresponding plurality of clutch devices each adapted to engage one of said wheels rotatively with said shaft, controlling means for said clutch-devices, a planet-carrier freely mounted concentrically with said shaft, planetary-pinions on said planet-carrier engaging said gear-wheels and operatively connected with a second series of planetary pinions, a driven shaft coaxial with said driving shaft, a gear-wheel fast thereon and engaged by said second series of planetary pinions, a toothed gear on said planet-carrier, an armature of a dynamo-electric machine, a toothed pinion thereon engaged by said last-mentioned toothed gear, and a compound-wound field system for said armature, the shunt winding thereof being separately excited and the series winding being connected across the armature in such manner as to reinforce the shunt field when the armature is driven by said planet-carrier, substantially as set forth.

In testimony whereof I affix my signature.

GILLIS von ZWEIGBERGK.